US010214892B2

(12) United States Patent
Tendick

(10) Patent No.: US 10,214,892 B2
(45) Date of Patent: *Feb. 26, 2019

(54) WASTEWATER PIPE STRUCTURE

(71) Applicant: George Tendick, Hudson, CO (US)

(72) Inventor: George Tendick, Hudson, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/269,199

(22) Filed: Sep. 19, 2016

(65) Prior Publication Data

US 2017/0101770 A1 Apr. 13, 2017

Related U.S. Application Data

(63) Continuation of application No. 14/071,272, filed on Nov. 4, 2013, now Pat. No. 9,447,902.

(51) Int. Cl.
F16L 9/00 (2006.01)
E03F 3/04 (2006.01)
F16L 1/036 (2006.01)
F16L 55/24 (2006.01)
E03F 3/06 (2006.01)
F16L 21/00 (2006.01)

(52) U.S. Cl.
CPC .............. E03F 3/04 (2013.01); E03F 3/06 (2013.01); F16L 1/036 (2013.01); F16L 9/006 (2013.01); F16L 55/24 (2013.01); F16L 21/00 (2013.01)

(58) Field of Classification Search
CPC ..................................... F16L 9/006
USPC ............... 138/109, 155, DIG. 11; 405/36, 39
See application file for complete search history.

(56) References Cited

U.S. PATENT DOCUMENTS

| 151,166 | A | | 5/1874 | Shaw et al. |
| 455,926 | A | * | 7/1891 | Ogden ................. F16L 3/00 138/106 |
| D24,013 | S | | 2/1895 | Crawford et al. |
| D24,114 | S | | 3/1895 | Crawford et al. |
| 1,168,909 | A | * | 1/1916 | Rook .................. F16L 9/18 138/115 |
| 1,978,774 | A | | 10/1934 | Voss et al. |
| D96,508 | S | | 8/1935 | Rosenburgh et al. |
| D96,509 | S | | 8/1935 | Rosenburgh et al. |
| 2,236,802 | A | | 4/1941 | McDonald |
| 2,818,084 | A | | 12/1957 | Tennison, Jr. |
| 3,225,545 | A | * | 12/1965 | Flegel ............... E01C 11/227 404/2 |
| 3,740,930 | A | * | 6/1973 | Cullom ................ F23J 11/00 110/119 |

(Continued)

OTHER PUBLICATIONS

Amitech Service AG, "GRP non-circular Pipe Systems", GRP non-circular Pipe Systems for Construction and Renovation of Sewer Systems, 2013, 16 pages.

(Continued)

Primary Examiner — James Hook
(74) Attorney, Agent, or Firm — Jennifer McCallum; The McCallum Law Firm PC

(57) ABSTRACT

Disclosed herein is wastewater pipe having a shape that is operable to flow both small and large volumes of wastewater. The wastewater pipe includes a bottom portion with a different diameter than to top portion. The top and bottom portions of the wastewater pipe are connected by side walls that extend tangentially from the bottom portion and intersect tangentially with the top portion. The pipes may also variously include alignment tabs.

13 Claims, 5 Drawing Sheets

(56) References Cited

U.S. PATENT DOCUMENTS

| | | | |
|---|---|---|---|
| 3,863,679 A | 2/1975 | Young | |
| 3,926,222 A | 12/1975 | Shroy et al. | |
| 3,983,873 A | 10/1976 | Hirschman | |
| 4,020,639 A * | 5/1977 | Nagare | E02B 11/005 |
| | | | 138/105 |
| 4,096,887 A | 6/1978 | Streit | |
| 4,134,431 A | 1/1979 | Davidson et al. | |
| 4,679,294 A | 7/1987 | Lomax et al. | |
| 4,796,669 A | 1/1989 | St. Onge | |
| 4,815,888 A * | 3/1989 | Stegmeier | E04F 15/14 |
| | | | 210/164 |
| 5,066,165 A * | 11/1991 | Wofford | E03F 3/046 |
| | | | 404/4 |
| 5,656,117 A * | 8/1997 | Wood | B29C 63/343 |
| | | | 138/97 |
| 6,000,881 A | 12/1999 | Becker et al. | |
| 6,132,137 A * | 10/2000 | Gunter | E01C 13/00 |
| | | | 404/2 |
| 6,263,903 B1 | 7/2001 | Sjoberg | |
| D478,969 S | 8/2003 | Mezzalira | |
| 6,692,186 B1 | 2/2004 | Suazo et al. | |
| 7,134,808 B2 * | 11/2006 | Albone | E01C 11/227 |
| | | | 404/2 |
| 7,361,274 B2 | 4/2008 | Lazaredes | |
| D573,699 S | 7/2008 | Clukies | |
| D603,941 S | 11/2009 | Leelaprachakul | |
| 8,689,837 B1 * | 4/2014 | Smith | E04D 13/08 |
| | | | 137/615 |
| D752,723 S | 3/2016 | Tendick | |
| 9,447,902 B2 * | 9/2016 | Tendick | F16L 1/036 |
| 2003/0079789 A1 * | 5/2003 | Egan | F16L 9/19 |
| | | | 138/112 |
| 2005/0074294 A1 | 4/2005 | Albone et al. | |
| 2007/0051417 A1 | 3/2007 | Boettner et al. | |
| 2007/0138080 A1 | 6/2007 | Clukies | |
| 2010/0037975 A1 | 2/2010 | Zoeller | |
| 2013/0061973 A1 | 3/2013 | Zerbes et al. | |
| 2015/0122366 A1 | 5/2015 | Tendick | |

OTHER PUBLICATIONS

Diamond Plastics Corporation, "Pvc Pipe for the 21st Century (brochure)", Http://www.dpcpipe.com/assets/pdf/prod/catalog.pdf, May 2013, 36 pages.

* cited by examiner

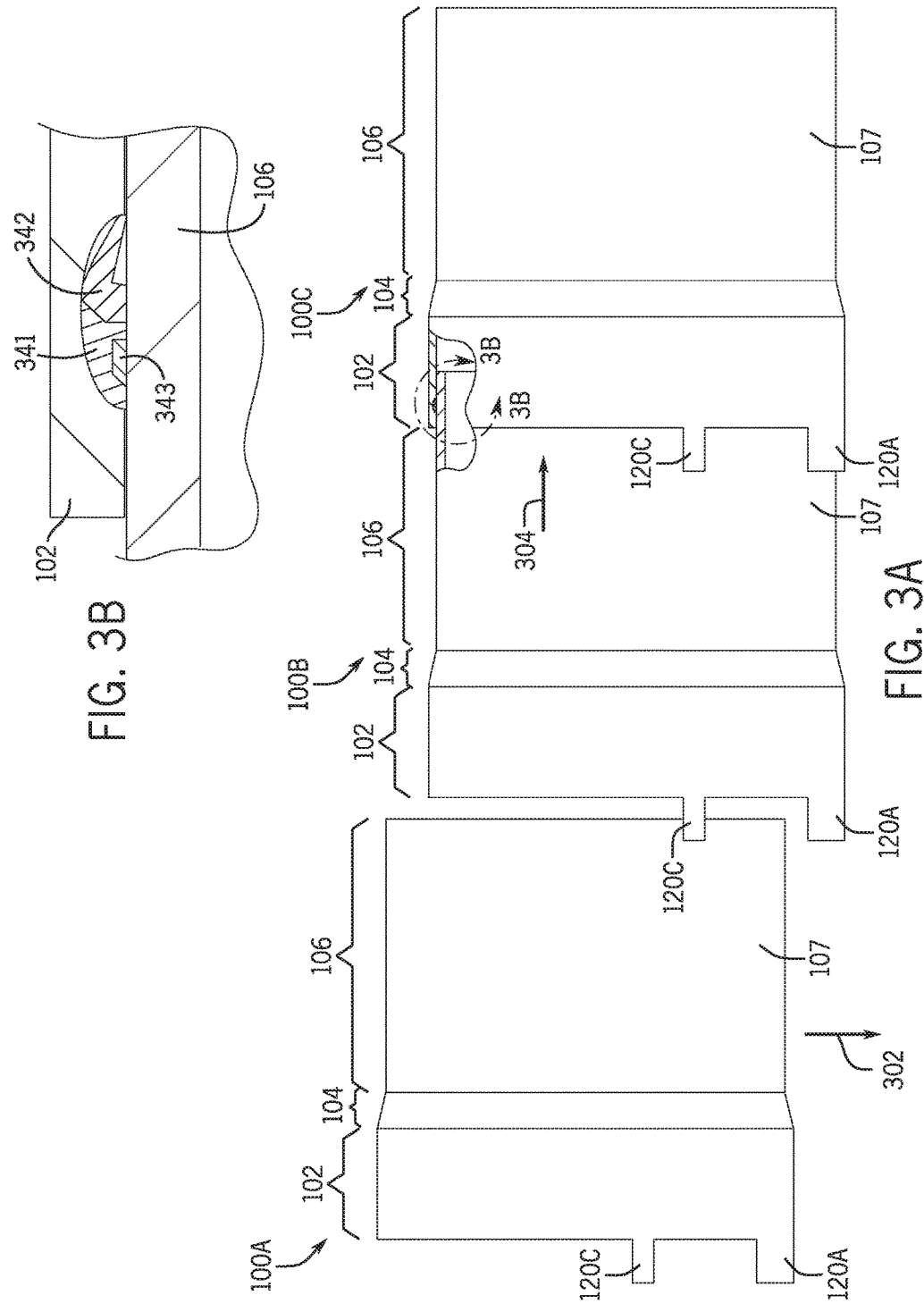

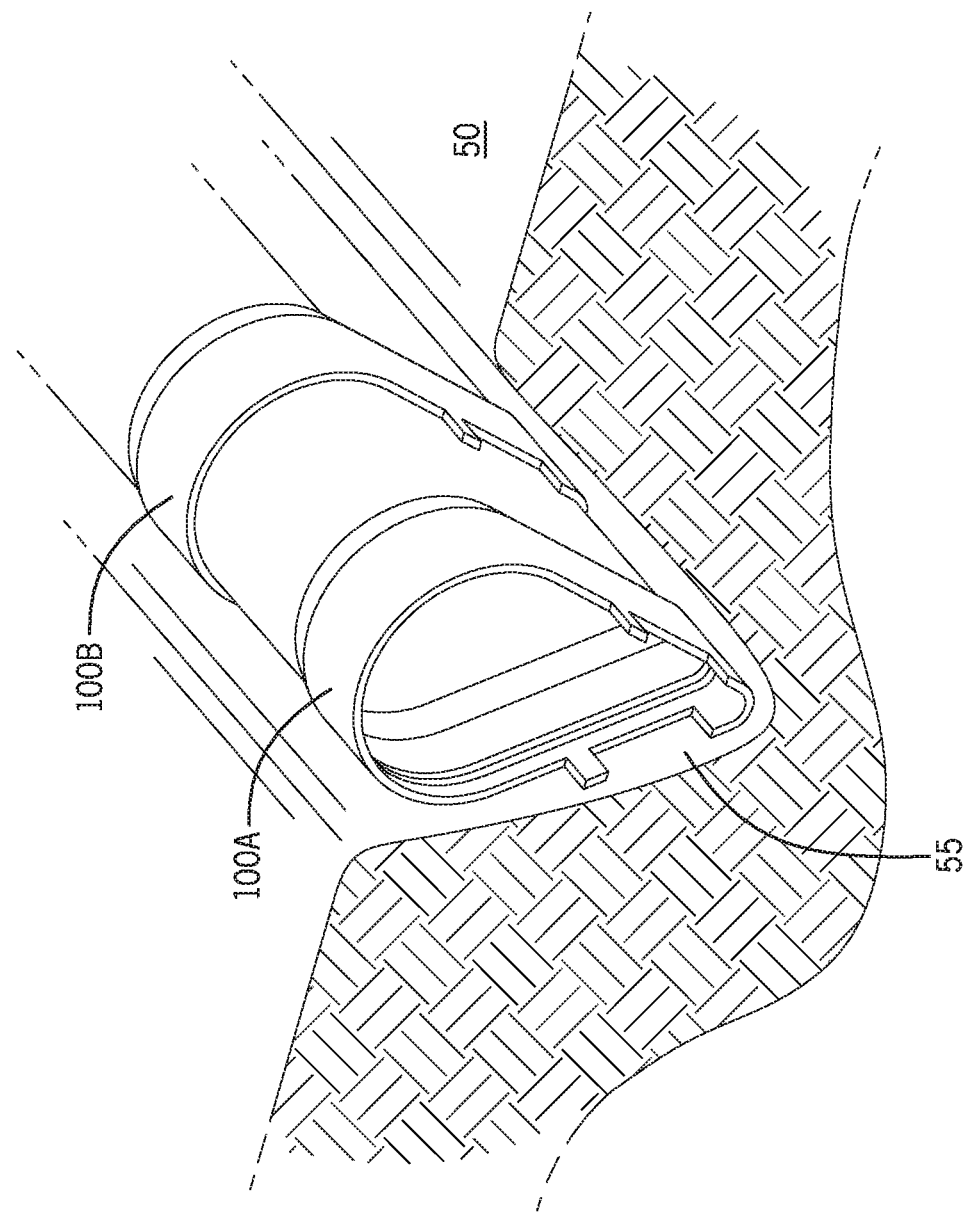

WASTEWATER PIPE STRUCTURE

CROSS REFERENCE TO RELATED APPLICATIONS

The present application is a continuation of co-pending U.S. patent application Ser. No. 14/071,272, filed Nov. 4, 2013, and entitled "Wastewater Pipe Structure", which is hereby incorporated by reference into the present application in its entirety.

TECHNICAL FIELD

The disclosure herein relates to wastewater management, and in particular to the pipe structure used in wastewater systems.

BACKGROUND

In the wastewater network in various cities, wastewater travels through various different sets of pipes. Water that is used in a home or industry is flushed through the building's pipes until it reaches local wastewater pipes which are typically owned and operated by city and town sewer departments. These pipes have the potential of extending thousands of miles in larger cities. The local wastewater pipes transport the wastewater into another level of wastewater pipes sometimes referred to as interceptor sewers. The interceptors, range from 4 inches to 11 feet in diameter. The interceptors carry the region's wastewater to treatment plants.

Various codes are typically in place which requires pipes of certain diameters to be placed at certain slopes to allow the system to function properly by gravity. The same codes also typically require the wastewater to maintain sufficient velocity in the pipes. The same codes further require that the pipes meet certain minimum size requirements in order to safely transport the wastewater of the entire area the pipe services without overfilling the pipe. However, installing a larger diameter wastewater pipe than what is required has little benefit and as a matter of fact will actually slow the flow of water in the sewer pipe itself, potentially dropping it below the requisite velocity.

Balancing the pluming needs of the wastewater system especially in areas of substantial growth can be difficult. For example a small system may be installed that safely handles the region's water for a period of time. But with substantial population growth to the same region, the small system will need to be replaced with a larger system. In a few years the new system could potentially need replacing as well. While some areas may be able to address this problem by installing oversized pipes in the first place, this is not possible for other areas because the oversized pipes may not meet the various code requirements (such as minimum flow velocity) or may not be able to be installed at sufficient pitches.

It is therefore desirable to provide an improved wastewater pipe for use in wastewater systems which addresses the above described problems or which more generally offers improvements or an alternative to existing wastewater pipes.

SUMMARY

As variously discussed herein, there is provided a wastewater pipe as defined in the accompanying claims.

In accordance with various embodiments, a wastewater pipe may include a bottom portion having an interior surface forming part of a bottom wall. The bottom wall may be defined by a first circular arc having a first axis and a first radius. The wastewater pipe may include a top portion having a top interior surface forming port of a top wall which may be defined by a second circular arc having a second axis and a second radius. A first side wall may extend tangentially from the bottom wall in a straight path and intersecting tangentially with the top wall. An opposing wall may extend tangentially from the bottom wall in a straight path and intersecting tangentially with the top wall. In one example, the first side wall may be positioned at an angle of 45-75 degrees from a plane passing through the first axis and the second axis. In one example, the first side may be positioned at an angle of 30 degrees from a plane passing through the first axis and the second axis.

In accordance with various embodiments, the wastewater pipe may also include a first end having a bell housing defined by a region of an increased first radius and an increased second radius. The bell housing may neck down such that a second end of the pipe has the same exterior profile as an interior profile of the bell housing.

In accordance with various embodiments, the first radius of the wastewater pipe may be smaller than the second radius. In one example, the second radius may be 6-10 times larger than the first radius. In one example, the first radius may be 4-16 inches and the second radius is 17-48 inches. In one example, the first radius is 4 inches and the second radius is 30 inches.

In accordance with various embodiments, the wastewater pipe may also include a guide tab extending from the bottom of the bell housing. The guide tab may have an interior surface that is contiguous with the interior surface of the bell housing. The guide tab may have a circular arc with the same axis as the first axis. The wastewater pipe may also include one or more side tabs extending from the first side wall and/or the second side wall. The one or more tabs may have and interior surface that is contiguous with the interior surface of the bell housing. The one or more tabs may be contiguous with the guide tab extending from the bottom of the bell housing. The guide tab may be operable to align the first axis with a first axis of an adjoining pipe by resting the end of the adjoining pipe on the guide tab during assembly.

In accordance with various embodiments, a method of providing a single wastewater line to service a growing area operable for both a small population as well as a larger population may be provided. The method may include obtaining a plurality of wastewater pipes. Each of the wastewater pipes may have a bottom portion. The bottom portion may have an interior surface defined by a first circular arc having a first axis and a first radius. Each of the wastewater pipes may have a top portion having a top interior surface defined by a second circular arc having a second axis and a second radius. The wastewater pipes may have a first side wall extending tangentially from the bottom wall in a straight path and intersecting tangentially with the top wall. The wastewater pipes may have a second side wall extending tangentially from the bottom wall in a straight path and intersecting tangentially with the top wall. The plurality of wastewater pipes may be secured end to end by inserting one end of a first pipe of the plurality of pipes into a bell housing of the second pipe of the plurality of pipes. The plurality of wastewater pipes may be laid in a trench. The plurality of wastewater pipes may buried in the trench.

In accordance with various embodiments, the securing process may include aligning the first axis of the first pipe with a first axis of the second pipe and aligning the second axis of the first pipe with a second axis of the second pipe. Prior to aligning the pipes, the first pipe may be set on and support by a guide tab extending from the bell housing of the second pipe. The guide tab may support the sides of the first pipe in addition to supporting the bottom of the first pipe causing alignment of the first axis of the first pipe and the first axis of the second pipe. A second set of guide tabs may extend from the opposing side walls further constraining the first pipe side walls such that the first axis of the first pipe and second pipe and the second axis of the first pipe and the second pipe are aligned by the guide tab and the second set of guide tabs. The second set of guide tabs may be contiguous with the first guide tab such that they form a continuous protrusion from the bottom and side walls of the second pipe. In accordance with various embodiments, the securing process may include providing a longitudinal force between the first pipe and the second pipe causing them to slide into one another while supported by the guide tab.

This summary of the disclosure is given to aid understanding, and one of skill in the art will understand that each of the various aspects and features of the disclosure may advantageously be used separately in some instances, or in combination with other aspects and features of the disclosure in other instances.

BRIEF DESCRIPTION OF THE DRAWINGS

The present invention will now be described by way of example only with reference to the following figures in which:

FIG. 3A is a side view of a wastewater pipe in accordance with one embodiment.

FIG. 3B is a sectional view of the cross section of 3B-3B as depicted from FIG. 1 and FIG. 3A.

FIG. 4 is an isometric front view of a wastewater pipe in a trench in accordance with one embodiment.

DETAILED DESCRIPTION

The size of the wastewater pipe used in a wastewater system is tailored to the size of the population the pipe services. For example, in many building codes the smallest diameter of traditional pipe that may be used is four inches. This size pipe is intended to serve a smaller population. As the population of the service area grows, the usage of the wastewater system grows the size of the pipe must also grow. The traditional cylindrical pipes utilized with large population can be 48 inches or more in diameter. Unlike traditional wastewater pipes, the wastewater pipes as discussed herein may not be merely cylindrical but may instead be shaped to accommodate relatively low flows and also increasing flows due to increasing population or other causes of increased wastewater flow. The wastewater pipes as discussed herein are thus suitable to service both the smaller population and also service the larger population without the need to replace of the smaller pipe sizes with larger ones. The wastewater pipe may have a shape that is operable to adequately flow both small and large volumes of wastewater. This shape may include a bottom portion with a different radius than a top portion. The top and bottom portions of the wastewater pipe may be connected by side walls that extend tangentially from the bottom portion and intersect tangentially with the top portion. The pipes may also variously include alignment tabs to assist in assembly.

Figure 1:
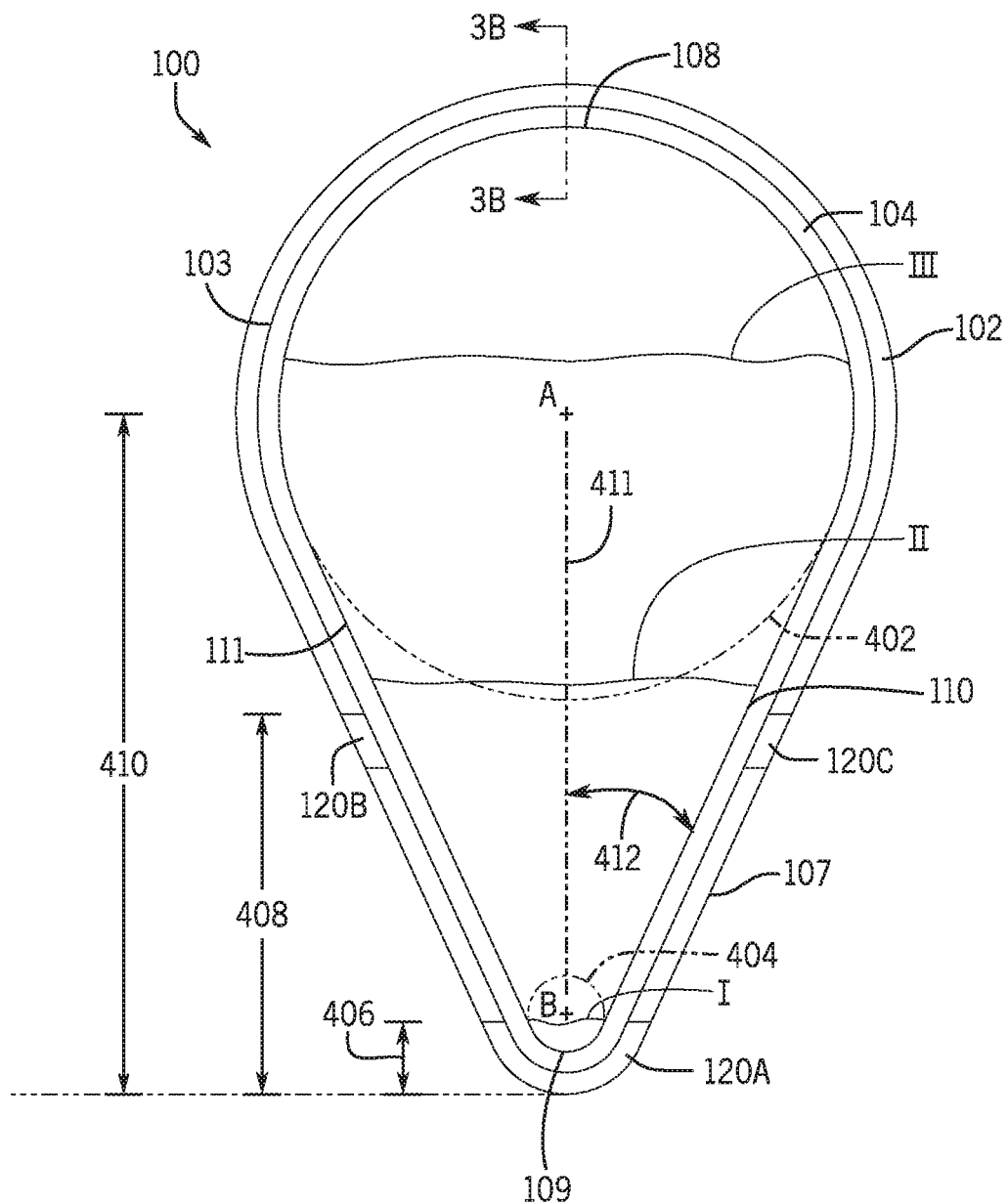
FIG. 1 is a front view of a wastewater pipe in accordance with one embodiment.

As described in the various embodiments herein and shown in FIGS. 1-4, the wastewater pipe 100 may accommodate a range of flows while maintaining adequate performance to satisfy the various codes and regulations that govern the installation, performance, and maintenance of wastewater systems. As shown in FIG. 1, the wastewater pipe 100 may have an interior wall that includes an upper circular arc surface 108, a lower circular arc surface 109, side wall surface 111 and side wall surface 110. The lower circular arc surface 109 may be defined by a portion of the outer circumference of the lower circular profile line 404. The lower circular arc surface 109 may be coaxial with axis B. The upper circular arc surface 108 may be defined by a portion of the outer circumference of the upper circular profile line 402. The lower circular arc surface 109 may be coaxial with axis B which is the axis of the lower circular profile line 404. Axis B extends the entire length of the wastewater pipe 100 as shown for example in FIG. 2. Each side of the lower circular arc surface 109 may be connected with each end of the upper circular arc surface 108 by wall surface 111 and side wall surface 110. Together these surfaces 108, 109, 110, and 111 may form the interior surface of the wastewater pipe 100. In various examples, the walls 110 and 111 may be straight walls (e.g. flat walls) intersecting tangentially with the surface 108 and 109.

As indicated above the wastewater pipe 100 may accommodate a range of flows. For example the flow may extend up to level I as shown in FIG. 1. In this instance, the flow level is very low and would flow poorly in pipe with a circular profile larger than surface 109 such as surface 108. In a second instance, the flow level may be at a medium level represented for example by level II as shown in FIG. 1. This level would flow best in a pipe with a circular profile between that of surface 109 and 108. As shown herein, the walls 111 and 110 allow for an increasing cross section that may accommodate level II. In a third instance, the flow level may be at a high level represented for example by level III as shown in FIG. 1. In this instance, the flow level is very high and would be too much for a pipe with a circular profile smaller than surface 108 such as surface 109. However, as shown herein, the expanding cross section of the pipe adequately accommodates a high flow level.

In accordance with various embodiments, as indicated above, wall surfaces 110/111 may be flat surfaces as depicted by the straight lines representing wall surfaces 110/111 in FIG. 1. As the pipe may have uniform wall thicknesses throughout (it should be noted that the wall thicknesses may vary depending on the application, strength requirements, etc. so the concept of uniform wall thicknesses should not be considered restrictive), these flat surfaces may also translate into flat wall sections. By providing connecting flat surfaces and corresponding flat walls certain flow controls may be realized in the pipe. Not to be restricted by theory, it is believed that the ratio of the circumference of the wall that wastewater contacts compared to the cross sectional area of the wastewater greatly influences the velocity of the wastewater in a pipe. As such, as the cross sectional area of wastewater in a pipe decreases compared to the cross section of the pipe, the velocity decreases. This is the effect in traditional round tubes. In an embodiment wherein wall surfaces 110/111 are curved surfaces, the relationship would be closer to the effect of cylindrical pipes with a greater curve reflecting the decrease in velocity greater and a flatter curve reflecting a smaller decrease in velocity. In an embodiment wherein wall surfaces 110 and 111 are flat, the velocity decrease is minimized. Additionally with flat wall surfaces 110 and 111 the exterior surfaces 107 do not protrude out so far. This may allow easier access under the pipe during installation and maintenance such as during the process of back filling a trench that the pipe is laid in (e.g. see FIG. 4).

In accordance with various embodiments, wall surfaces 110/111 may be positioned at an angle 412 to plane 411, which passes through axis A and axis B as shown by an imaginary line in FIG. 1. In various examples, angle 412 may be from of 15-45 degrees from the plane 411. In a specific example angle 411 may be 30 degrees from 411. Stated another way wall surface 110 and wall surface 111 may be at an angle of sixty degrees relative to one another symmetric about axis A and axis B.

The lower circular profile line 404 may have a radius that also represents the radius of the lower circular arc surface 109 with axis B being coaxial with the lower circular arc surface 109. Similarly upper circular profile line 402 may have a radius that also represents the radius of the upper circular arc surface 108 with axis A being coaxial with the upper circular arc surface 108. The lower circular profile line 404 may represent the minimum sized pipe utilized for a specific population. The upper circular profile line 402 may represent up to the expected pipe size for the forecasted population. Since the cross sectional area of the lower circular profile line 404 and the area between side wall surfaces 110 and 111 add to the area, it may not be necessary to size the upper circular arc surface 108 as large as a typical cylindrical wastewater pipe that would serve the same forecasted population. The lower circular arc surface 109 may have a smaller radius than the upper circular arc surface 108. In accordance with one example, radius of the upper circular arc surface may be 6-10 times larger than the radius of the lower circular arc surface 109. In accordance with one example, the lower circular arc surface 109 may have a radius that is 4-16 inches and the upper circular arc surface may have a radius that is 17-48 inches or larger. In a specific example, the lower circular arc surface 109 may have a radius that is 4 inches and the upper circular arc surface may have a radius that is 30 inches.

In accordance with various embodiments, the wastewater pipe 100 may include an enlarged end or bell housing 102 operable for sliding over a mating pipe. The bell housing 102 may be defined by a region wherein the radius of the upper circular arc surface 108 and lower circular arc surface 109 is increased illustrated in FIG. 1 as the exterior wall outlining the inner surface. The interior surface of the bell housing 103 may be sized to receive the exterior surface of the wastewater pipe (shown if FIG. 2 as exterior surface 107.) The bell housing 102 may neck down such that the resulting transition 104 translates the interior surface of the bell housing 103 into the interior surface 108/109/110/111 of the wastewater pipe 100.

Figure 2:
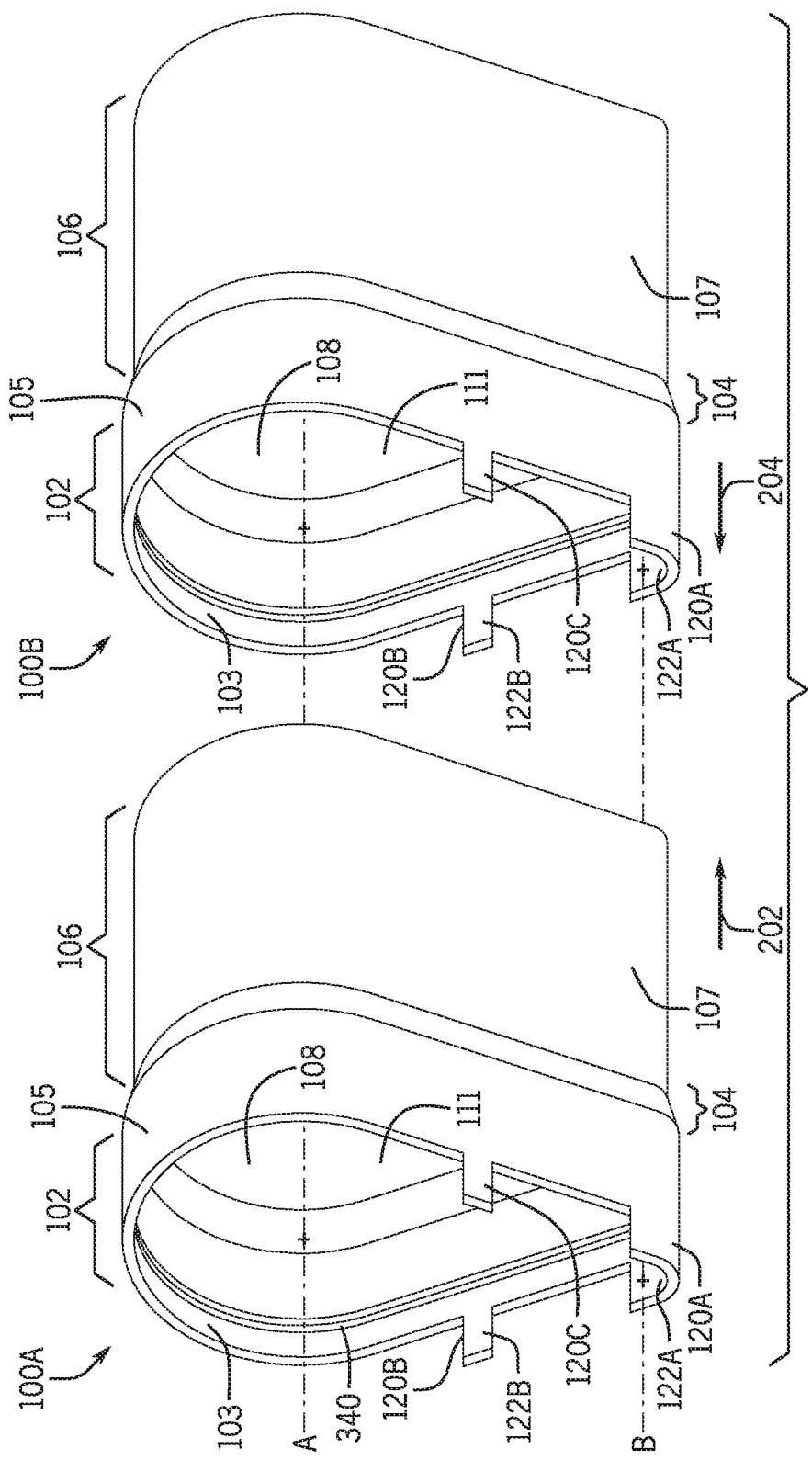
FIG. 2 is an isometric side view of a wastewater pipe in accordance with one embodiment.

In accordance with various embodiments, shown in FIG. 2, the interior surface of the bell housing 103 may also include a device for sealing the connection between pipes. In one example, seal 340 may reside on the interior surface of the bell housing 103. Seal 340 may form a layer between the bell housing 103 and the exterior surface 107 of another pipe. This may prevent or limit wastewater form exiting the system at these junctions. Other devices may also be used for sealing the connections, such as o-rings, grommets, adhesives and so on. In one example as shown in FIG. 3B, the seal 340 may be a rieber style gasket. For example, the gasket may have a metallic restraint ring 343 in contact with the body portion 106 and surrounded by a metallic restraint casing 341 which may be in contact with both bell housing 102 and the body portion 106. The metallic restraint casing may also abut against a gasket 342. As indicated the gasket may be rieber style gasket. But is should be reiterated that gaskets, o-rings, grommets, adhesives, etc. that can provide a sufficient seal between pipes may be utilized.

In accordance with various embodiments, bell housing 102 may include one or more guide tabs 120. For example, a guide tab 120A, may extend from the bottom of the bell housing around the radius. In various examples, a guide tab 120B, may extend from the side wall of the bell housing forming a contiguous surface with wall surface 111. In various examples, a guide tab 120C, may extend from the side wall of the bell housing forming a contiguous surface with wall surface 110. Each wastewater pipe may have all of these guide tabs, none of the guide tabs or any combination thereof. Each guide tab 120A/120B/120C may have an interior surface 122. For example, if guide tab 120A is present, interior surface 122 A may be contiguous with the lower circular arc surface 109. If guide tab 120B is present, interior surface 122B may be contiguous with the wall surface 110. If guide tab 120B is present, interior surface 122C may be contiguous with the wall surface 111. Each of the tabs 120A/120B/120C may be separate discreet protrusions or each of the tabs may be directly connected and contiguous with one another. For example, as discreet protrusions from the bell housing 102, tabs 120A/120B/120C may be as illustrated in FIG. 1. As formed to be directly connected and contiguous with one another, the tabs 120A/120B/120C may extend all of the way around the lower perimeter of the bell housing. For example, the tabs may extend to height 410 at Axis A. The tabs may extend to a height less than 406 or axis B. The tabs may extend to a height between 410 and 406 such as height 408 depicted in FIG. 1.

In accordance with various embodiments, one or more of the guide tabs 120A/120B/120C may be operable to align the axis B in a first wastewater pipe with a first axis of an adjoining wastewater pipe. This may be accomplished by resting the end of the adjoining pipe on the guide tab. By providing both vertical and lateral restraint, the guide tabs 120A/120B/120C may cause the axes to be aligned. By providing support across a greater range around the perimeter, the guide tabs 120A/120B/120C may provide greater alignment making assembly of the wastewater pipes simpler.

FIG. 2 further illustrates the embodiments discussed above in an isometric side view. As can be better viewed here, the wastewater pipe 100 (100 referring to both 100A and 100B as they are just separate sections of the same style of pipe) may have a body portion 106, a bell housing 102, and a transition 104. The axis A from wastewater pipe 100A and wastewater pipe 100B may be aligned. Similarly axis B from wastewater pipe 100A and wastewater pipe 100B may be aligned. This alignment allows the exterior surface 107 to be inserted into interior bell housing surface 103. The exterior surface 107 may be configured to align or be supported by one or more of guide tabs 120A/120B/120C. By forcing the wastewater pipe 100A and wastewater pipe 100B along arrows 202 and 204 the wastewater pipes may be brought together forming a longer pipe to be used in a wastewater system.

FIG. 3 further illustrates the embodiments discussed above in a side view. As shown herein, during installation, wastewater pipe 100A may be lowered along arrow 302. Once lowered long arrow 302, guide tabs 120A/120C (120B not shown as it is on the opposing side) may support the wastewater pipe 100A. Once supported the wastewater pipe may be forced along arrow 304 such that exterior surface 107 engages the interior of bell housing 102. As shown in FIG. 3, wastewater pipe 100B is engaged with wastewater pipe 100C long arrow 304.

In accordance with one embodiment, as shown in FIG. 4, a plurality of wastewater pipes 100A and 100B may be connected end to end. The wastewater pipes 100A and 100B may be placed in ditch 55. The trench 55 may be formed into the ground 50 for the purpose of submerging the wastewater pipes underground as is typical in the industry. The trench can have sloped sidewalls possibly be less likely to collapse during installation, use or maintenance.

The wastewater pipes 100A and 100B may be separate sections of the same style of pipes. The two separate sections may be inserted into one another in the direction of arrows 202 and 204, as shown in FIG. 2, forming a longer section of pipe. The wastewater pipe 100 (100 referring to both 100A and 100B as they are just separate sections of the same style of pipe) may have a body portion 106, a bell housing 102, and a transition 104.

Figure 5C:
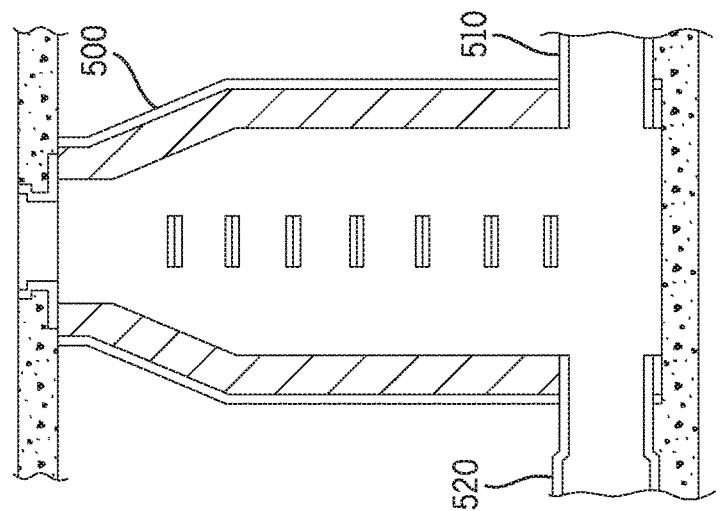
FIGS. 5A-C are front rear and cross sectional views of the wastewater pipe of FIG. 1 forming a part of a manhole section.
Figure 5B:
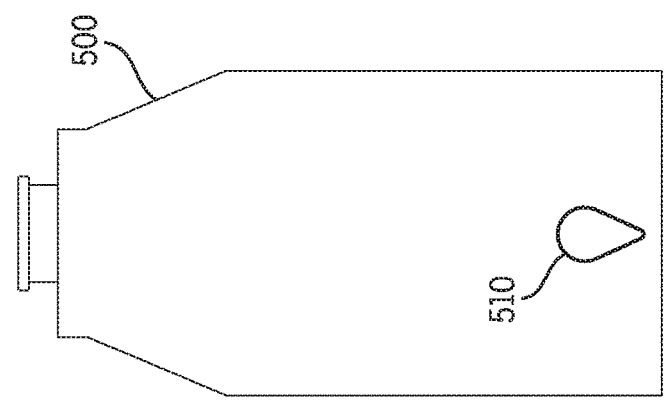
Figure 5A:
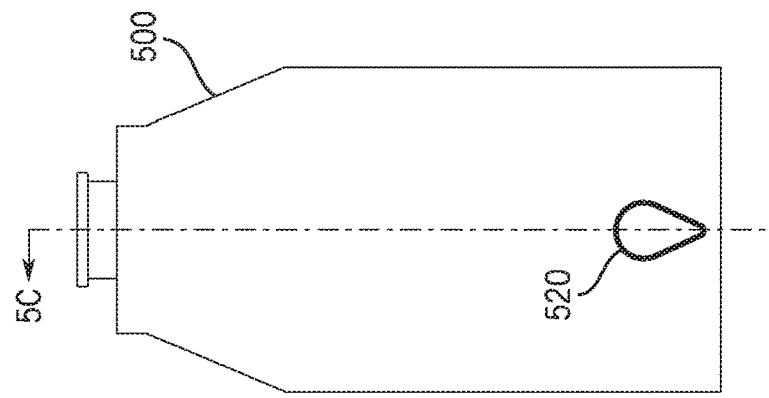

As shown in FIGS. 5A-C The pipes may also be connected together over a distance; at regular intervals the pipes may engage a junction box 500 (e.g. a manhole). This may allow for maintenance but also may allow for larger slope variations by including drops in the junction boxes. Each of the junction boxes 500 may include an inlet 520 and an outlet 510 having the profile of the pipe as discussed above. These inlets and outlets may provide mating sections to engage the wastewater pipes. For example, one side of the junction box may have a bell housing such as inlet 520 as shown in FIG. 5C. The other side of the junction box may have a pipe exterior for engaging with a bell housing such as outlet 510 as shown in FIG. 5C.

In accordance with various embodiments, the wastewater pipe 100 may be made from any material or process such materials may include reinforced concrete pipe, (R.C.P.), asbestos cement pipe (A.C.P.), vitrified clay pipe (V.C.P.), Acrylonitrile-Butadiene-Styrene (A.B.S.), ductile iron pipe, Polyvinyl Chloride (P.V.C.), various composites including epoxy lined, polylined D.I.P. or V.C.P. encased piping, and so on. The wastewater pipe 100 may also may manufactured in any process including for example, extrusion, composite winding, molding, and so on.

It should be noted that all directional and/or dimensional references (e.g., upper, lower, upward, downward, left, right, leftward, rightward, top, bottom, above, below, front, back, rear, forward, backward, rearward, inner, outer, inward, outward, vertical, horizontal, clockwise, counterclockwise, length, width, height, depth, and relative orientation) are only used for identification purposes to aid the reader's understanding of the implementations of the disclosed invention(s), and do not create limitations, particularly as to the position, orientation, use relative size or geometry of the invention(s) unless specifically set forth in the claims.

Connection references (e.g., attached, coupled, connected, joined, and the like) are to be construed broadly and may include intermediate members between a connection of elements and relative movement between elements. As such, connection references do not necessarily infer that two elements are directly connected and in a fixed relation to each other.

We claim:

1. A wastewater pipe comprising:
a body having a profile defined by:
   a bottom portion having an interior surface defined by a first circular arc having a first axis and a first radius;
   a top portion having a top interior surface defined by a second circular arc having a second axis and a second radius different than the first axis and the first radius;
   a first side wall extending tangentially from the bottom interior surface and intersecting tangentially with the top interior surface; and
   a second side wall extending tangentially from the bottom interior surface and intersecting tangentially with the top interior surface; and
a bell housing extending from one end of the body, the bell housing defining an interior surface that is configured to tightly receive a body portion of another wastewater pipe having substantially the same profile as the body, the bell housing further comprising a guide portion, the guide portion extending longitudinally further than an upper portion of the bell housing and forming a substantially contiguous surface with the interior surface of the bell housing such that the body portion of the other wastewater pipe is able to be lowered onto the guide portion and then slid along the guide portion into the bell housing while being at least partially supported by the guide portion.

2. The wastewater pipe of claim 1, wherein the bell housing is defined by a region of an increased first radius and an increased second radius.

3. The wastewater pipe of claim 2, wherein the guide portion is a guide tab extending from the bottom of the bell housing, wherein the guide tab has a surface that is contiguous with the interior surface of the bell housing and is a circular arc with the same axis as the first axis.

4. The wastewater pipe of claim 3, wherein the guide tab includes a shape or position that is operable to align the first axis with a first axis of an adjoining pipe by resting the end of the adjoining pipe on the guide tab.

5. The wastewater pipe of claim 3, further comprising one or more tabs extending from the first side wall or the second side wall, wherein the one or more tabs have an interior surface that is contiguous with the interior surface of the bell housing.

6. The wastewater pipe of claim 5, wherein the one or more tabs are contiguous with the guide tab extending from the bottom of the bell housing.

7. The wastewater pipe of claim 1, wherein the first side wall and the second side wall extend in a straight path between the bottom interior surface and the top interior surface.

8. The wastewater pipe of claim 1, wherein the first radius is smaller than the second radius.

9. The wastewater pipe of claim 1, wherein the second radius is 6-10 times larger than the first radius.

10. The wastewater pipe of claim 1, wherein the first radius is 4-16 inches and the second radius is 17-48 inches.

11. The wastewater pipe of claim 1, wherein the first radius is 4 inches and the second radius is 30 inches.

12. The wastewater pipe of claim 1, wherein the first side is positioned at an angle of 15-45 degrees from a plane passing through the first axis and the second axis.

13. The wastewater pipe of claim 1, wherein the first side is positioned at an angle of 30 degrees from a plane passing through the first axis and the second axis.

* * * * *